March 24, 1953        L. R. TERRY        2,632,429

TWO-CYCLE INTERNAL-COMBUSTION ENGINE

Filed Feb. 19, 1951        2 SHEETS—SHEET 1

INVENTOR.
Loren R. Terry
BY
ATTORNEY.

March 24, 1953 L. R. TERRY 2,632,429
TWO-CYCLE INTERNAL-COMBUSTION ENGINE
Filed Feb. 19, 1951 2 SHEETS—SHEET 2
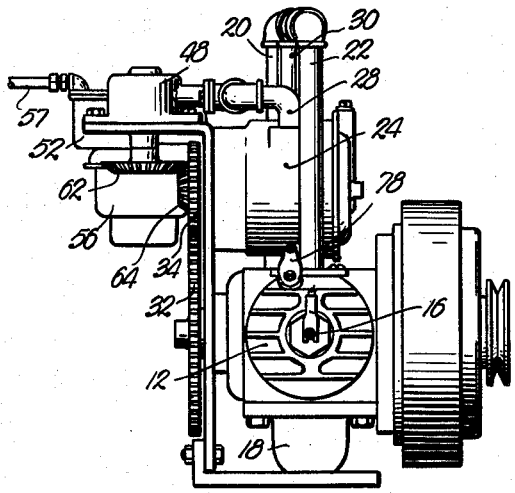
Fig. 3.
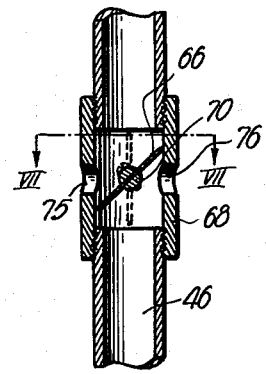
Fig. 6.
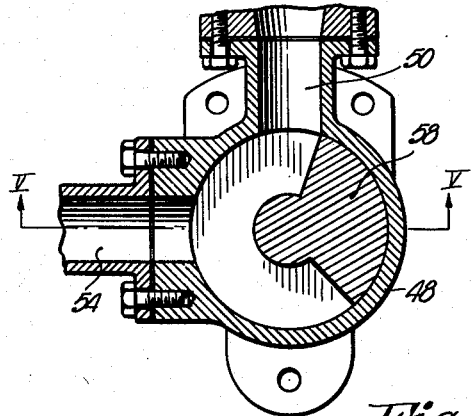
Fig. 4.
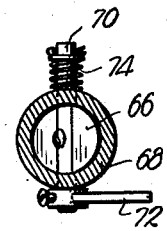
Fig. 7.
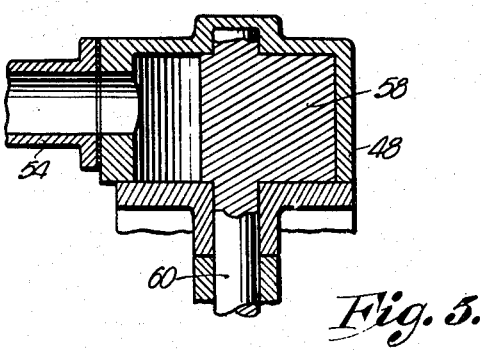
Fig. 5.
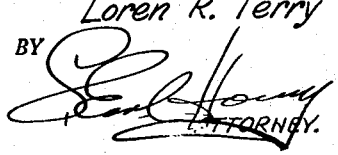
INVENTOR.
Loren R. Terry
BY
ATTORNEY.

Patented Mar. 24, 1953

2,632,429

UNITED STATES PATENT OFFICE 2,632,429

TWO-CYCLE INTERNAL-COMBUSTION ENGINE

Loren R. Terry, Webb City, Mo.

Application February 19, 1951, Serial No. 211,736

4 Claims. (Cl. 123—119)

This invention relates to improvements in internal combustion engines, the primary object being to provide additive structure for increasing compression and therefore, the horsepower of gasoline engines by effectively forcing the fuel mixture into the cylinders and more effectively exhausting the articles of combustion quickly and completely during continued operation.

Two-cycle internal combustion engines particularly are not fully efficient because of the fact that the fuel mixture is not directed to the cylinders with sufficient force and velocity and further, because the products of combustion are not evacuated during each stroke of the pistons with sufficient completeness and rapidity. Furthermore, any internal combustion engine operates more effectively if complete vaporization of the gasoline can be attained and for the most part, present day carburetors are incapable of perfection with respect to proper vaporization.

It is the most important object of the present invention therefore, to incorporate in an internal combustion engine a rotary blower operable primarily to receive the fuel mixture, i. e., gasoline and air, and to direct the same with force into the cylinders and capable secondarily, of acting upon the fuel mixture in such manner as to more fully vaporize the same prior to passage into the engine block.

It is a further object of this invention to provide a blower for internal combustion engines that is capable additionally, through connection with the exhaust line of the engine, of evacuating the cylinders of products of combustion thereby removing the adverse effect of such products of combustion upon free movement of the pistons within their respective cylinders.

It is a still further object of this invention to provide a blower for internal combustion engines capable of aiding in the evacuation of the products of combustion and adapted for receiving at least a portion thereof with atmospheric air and redirecting the same into the engine block through the inlet openings primarily provided for receiving the fuel mixture.

Other objects include the way in which a valve is operably connected with the crank shaft of the engine to control the flow of fuel mixture to the cylinders; the way in which a second valve is provided in the exhaust line to control the amount of air and/or products of combustion redirected to the cylinders by the blower; the way in which the last mentioned valve is adapted to direct selected amounts of products of combustion to the atmosphere as desired; and many more minor objects, all of which will be made more clear or become apparent as the following specification progresses, reference being had to the accompanying drawing, wherein:

Fig. 3 is an end elevational view.

Fig. 4 is an enlarged, detailed, cross-sectional view taken on line IV—IV of Fig. 1.

Fig. 5 is an enlarged, detailed, cross-sectional view taken on line V—V of Fig. 4.

Fig. 6 is an enlarged, detailed, fragmentary, section on the longitudinal axis of the exhaust pipe illustrated in Figs. 1 and 2; and Fig. 7 is a detailed, cross-sectional view taken on line VII—VII of Fig. 6.

Figure 1:
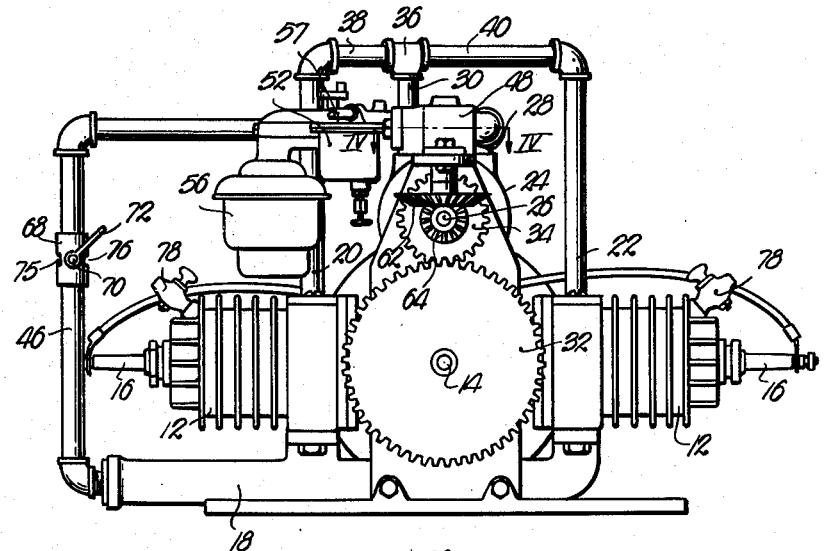
Figure 1 is a side elevational view of a two-cycle internal combustion engine made pursuant to my present invention.
Figure 2:
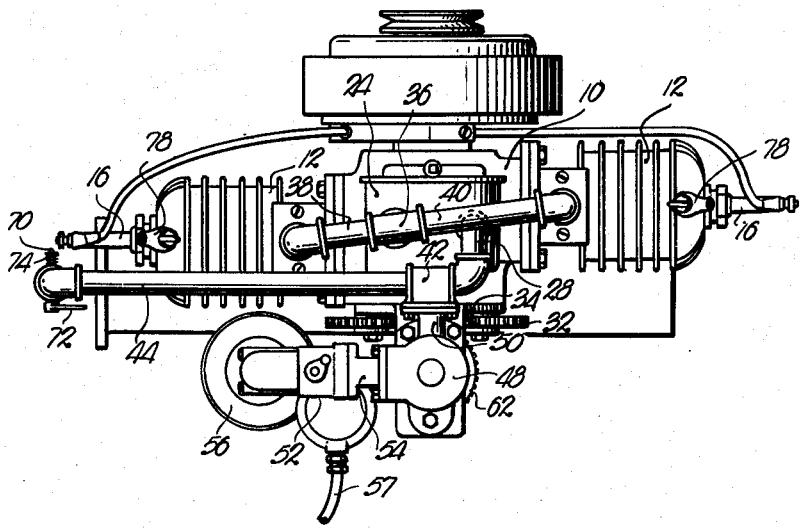
Fig. 2 is a top plan view thereof.

Certain portions of the two-cycle internal combustion engine illustrated in the drawings, are of conventional character and include an engine block broadly designated by the numeral 10 that is hollow and provided with a pair of opposed cylinders 12.

Each cylinder 12 is provided with a reciprocable piston, not shown, and such pistons are operably connected with a crank shaft through the medium of the usual rods, bearings, wrist pins and associated parts, one end of such crank shaft being shown in Fig. 1 and designated by the numeral 14.

An electrical system is associated with the engine and includes spark plugs 16, together with a magneto not illustrated, or other means of effecting proper timing and firing as is well understood by those skilled in this art.

The block 10 is provided with an exhaust port for each cylinder 12 respectively that in turn connects with a common line 18 and likewise, the block 10 is provided with inlet ports for each cylinder 12 respectively, that are connected with lines 20 and 22 respectively.

In accordance with the present invention, a blower 24 is suitably mounted directly upon the uppermost face of the block 10 preferably between the cylinders 12, blower 24 being of any suitable character and preferably having a rotatable, vaned drum mounted therein. Such drum is attached to a shaft 26 that is spaced above the crank shaft 14 as shown in Fig. 1 and in parallelism therewith.

The blower 24 is provided with an inlet opening and an outlet opening, the former having a line 28 in register therewith and the outlet opening of the blower 24 being in register with a short vertical tube 30. Rotation of the shaft 26 is accomplished through connection with the crank shaft 14 by intermeshing gears 32 and 34 on shafts 14 and 26 respectively.

A T 36 connected with the tube 30 joins the two inlet lines 22 for cylinders 12 by means of horizontal pipes 38 and 40. The inlet line 28 for blower 24 is joined with exhaust line 18 by means of a T 42 and pipes 44 and 46. A valve housing 48 also couples with T 42 by means of branch 50 and with a conventional carburetor 52 through the medium of a branch 54. An air cleaner 56 may be provided for the carburetor 52 if desired and obviously, fuel is fed to the carburetor 52 from a suitable supply tank not shown and through a conduit 57. The particular nature of carburetor 52 forms no part of this invention and therefore, has not been detailed. The importance of valve 58 however, in housing 48 requires further analysis and such valve 58 is mounted on a vertical shaft 60 having a beveled gear 62 mounted thereon in constant mesh with a similar gear 64 on the shaft 26.

It is noted that the housing 48 is cylindrical internally and that the branches 50 and 54 extend therefrom tangentially so that as the valve 58 rotates, it will alternately close and open the branches 50 and 54. Valve 58 comprises a segment of a solid cylinder but its precise shape is dependent upon the disposition of the branches 50 and 54 relatively since synchronization is desired according to the speed of rotation of the crank shaft 14 and the associated gearing 32, 34, 62 and 64.

A second valve 66 that comprises a relatively thin disc is mounted in a tubular section 68 forming a part of the pipe 46 and upon a rotatable pin 70 that traverses the longitudinal axis of the pipe 46. Manipulation of the valve 66 may be manual through the medium of a lever 72 on the pin 70 and a spring 74 yieldably holds the valve 66 in a selected position. Diametrically opposed apertures 75 and 76 are provided in the section 68 in alignment with the pin 70 as shown in Figs. 6 and 7. A pet cock 78 is provided for each cylinder 12 respectively adapted to place the same into communication with the atmosphere to facilitate starting of the engine by relieving the compression that may be built up therein after the engine is deenergized.

During operation of the engine, reciprocation of the pistons in cylinders 12 rotates crank shaft 14 and thereby the gear 32 to continuously rotate the vaned drum within blower 24 and forming a part thereof, all by virtue of the gear 34 on shaft 26 of blower 24 being in mesh with gear 32. Simultaneously, the crank shaft 14 imparts rotation to valve 58 continuously by the connection of shaft 60 to shaft 26 through gears 62 and 64 respectively. Blower 24 operates when the valve 58 is in a position such as illustrated in Fig. 4 placing the branches 50 and 54 into communication to draw fuel mixture from carburetor 52 and force the same into cylinders 12 by way of tube 30, T 36, pipes 38 and 40 and lines 20 and 22. Before the fuel mixture passes to the tube 30, the rapidly rotating vaned drum of blower 24 causes further atomization of the mixture of air and the same passes to the cylinders 12 in a highly vaporized condition. It is seen that irrespective of the position of valve 66, blower 24 will operate to draw air into the pipe 44, T 42 and line 28 by way of aperture 75 simultaneously with the forcing of fuel mixture from carburetor 52 into line 28. The valve 58 is synchronized to close the passage from branch 54 to branch 50 during exhausting of articles of combustion through line 18. The exhaust gases from both cylinders 12 thereupon pass into pipe 46 and, depending upon the position of valve 66, a portion thereof flows into pipe 44 and the remainder escapes through aperture 76. Such flow of some of the exhaust gases into pipe 44 is aided by the action of continuously operating blower 24 and obviously, the amount of air that is directed to the cylinders 12 from aperture 75 and the amount of exhaust gases that are admixed therewith for passage through the pipe 44, is determined by the position of valve 66. Valve 66 accordingly is movable from the fully closed position so far as permitting the flow of exhaust gases to the pipe 44 is concerned as shown in full lines in Fig. 6 to a fully open position as shown in dotted lines in Fig. 6. When the valve 66 is closed therefore, all of the exhaust gases will be caused to flow from the pipe 46 by way of aperture 76 and aperture 75 will remain open to the atmosphere for feeding air to the pipe 44 as motivated by blower 24. Obviously, if desired, the valve 66 may be thermostatically controlled rather than being rendered adjustable through the medium of lever 72.

It is seen that through the operation of the internal combustion engine hereinabove described, the cylinders 12 are supplied with fuel under force of the blower 24 and that by the same token, the cylinders 12 are exhausted of the products of combustion by the suction effect of blower 24. These actions, together with the feeding of the cylinders with a portion of the articles of combustion together with pure air from the atmosphere, has proved to enhance the operation of the engine tremendously and increased its horsepower to a great extent.

Modifications may of course, be made within the broad principles hereof and it is not desired to be limited by the particular means chosen for illustration for instance relative to the injection of the fuel into the cylinder block. To this extent conventional fuel injecting means may be used and the blower provided solely for the purpose of exhausting the cylinders of the products of combustion and so far as increasing the horsepower, as well as other more excellent performance is concerned, the results would be equally as good.

Accordingly, it is desired to be limited only by the spirit of the invention as defined by the scope of the appended claims.

Having thus described the invention what is claimed as new and desired to be secured by Letters Patent is:

1. In an internal combustion engine, a hollow block having cylinders each provided with an inlet port and an exhaust port; a reciprocable piston in each cylinder respectively; a crank shaft operably connected with the pistons; a rotatable blower coupled with said crank shaft and having an outlet tube joined with said inlet ports of the cylinders and an inlet opening; a conduit connected with said inlet opening for directing combustible fuel to said blower; a pipe placing said exhaust ports into communication with said inlet opening of the blower, said pipe having an outlet aperture for products of combustion and an air inlet aperture; and a valve in the pipe between the apertures for controlling flow of said products of combustion to the blower and said outlet aperture and flow of air to the blower through said air inlet aperture.

2. In an internal combustion engine, a hollow block having cylinders each provided with an inlet port and an exhaust port; a reciprocable piston in each cylinder respectively; a crank shaft operably connected with the pistons; a rotatable blower coupled with said crank shaft and having an outlet tube joined with said inlet ports of the cylinders and an inlet opening; a conduit connected with said inlet opening for directing combustible fuel to said blower; and a pipe placing said exhaust ports into communication with said inlet opening of the blower.

3. In an internal combustion engine, a hollow block having cylinders each provided with an inlet port and an exhaust port; a reciprocable piston in each cylinder respectively; a crank shaft operably connected with the pistons; a rotatable blower coupled with said crank shaft and having an outlet tube joined with said inlet ports of the cylinders and an inlet opening; a conduit connected with said inlet opening for directing combustible fuel to said blower; and a pipe placing said exhaust ports into communication with said inlet opening of the blower, said pipe having an air inlet aperture formed therein.

4. In an internal combustion engine, a hollow block having cylinders each provided with an inlet port and an exhaust port; a reciprocable piston in each cylinder respectively; a crank shaft operably connected with the pistons; a rotatable blower coupled with said crank shaft and having an outlet tube joined with said inlet ports of the cylinders and an inlet opening; a conduit connected with said inlet opening for directing combustible fuel to said blower; a pipe placing said exhaust ports into communication with said inlet opening of the blower, said pipe having an air inlet aperture formed therein; and a valve in said pipe for varying the amount of air and products of combustion passing to the blower.

LOREN R. TERRY.

REFERENCES CITED

The following references are of record in the file of this patent:

UNITED STATES PATENTS

| Number | Name | Date |
|---|---|---|
| 1,448,167 | Sweet | Mar. 13, 1923 |
| 1,750,919 | Becker | Mar. 18, 1930 |
| 2,215,030 | Chastain et al. | Sept. 17, 1940 |